(12) United States Patent
Tempel

(10) Patent No.: US 11,549,596 B2
(45) Date of Patent: Jan. 10, 2023

(54) DIAPHRAGM VALVE

(71) Applicant: Neoperl GmbH, Mullheim (DE)

(72) Inventor: Marc Tempel, Freiburg (DE)

(73) Assignee: NEOPERL GMBH, Mullheim (DE)

( * ) Notice: Subject to any disclaimer, the term of this patent is extended or adjusted under 35 U.S.C. 154(b) by 0 days.

(21) Appl. No.: 16/474,755

(22) PCT Filed: Nov. 28, 2017

(86) PCT No.: PCT/EP2017/080583
§ 371 (c)(1),
(2) Date: Jun. 28, 2019

(87) PCT Pub. No.: WO2018/133980
PCT Pub. Date: Jul. 26, 2018

(65) Prior Publication Data
US 2019/0346050 A1   Nov. 14, 2019

(30) Foreign Application Priority Data

Jan. 19, 2017  (DE) .......................... 202017100281.0

(51) Int. Cl.
*F16K 7/17*    (2006.01)
*F16K 27/02*    (2006.01)
(52) U.S. Cl.
CPC ............ *F16K 7/17* (2013.01); *F16K 27/0236* (2013.01)
(58) Field of Classification Search
CPC ......... Y10T 137/7895; Y10T 137/7888; F16K 7/17; F16K 27/0236

USPC .......................................... 92/98 R; 137/859
See application file for complete search history.

(56) References Cited

U.S. PATENT DOCUMENTS

| | | | | | |
|---|---|---|---|---|---|
| 1,732,052 | A | * | 10/1929 | Joyce | G01F 23/164 92/98 R |
| 2,300,722 | A | * | 11/1942 | Kleinhans | F15B 1/12 138/30 |
| 2,339,876 | A | * | 1/1944 | Phillips | F15B 1/125 138/30 |
| 2,659,565 | A | | 11/1952 | Johnson et al. | |
| 3,007,527 | A | * | 11/1961 | Nelson | E21B 21/10 166/326 |
| 3,083,943 | A | * | 4/1963 | Stewart, Jr. | F16K 31/1266 251/61.1 |
| 3,307,403 | A | * | 3/1967 | Bernett | G01K 5/44 60/527 |
| 3,411,522 | A | * | 11/1968 | Golden | G05D 16/0641 137/116.5 |
| 3,416,461 | A | * | 12/1968 | Mcfarland | F04B 43/067 417/568 |

(Continued)

FOREIGN PATENT DOCUMENTS

| | | |
|---|---|---|
| CN | 106065956 | 11/2016 |
| DE | 2256517 | 5/1973 |

(Continued)

*Primary Examiner* — Jessica Cahill
(74) *Attorney, Agent, or Firm* — Volpe Koenig

(57) ABSTRACT

A diaphragm valve (1) having a diaphragm (3) that is clamped between two housing parts (9, 10), and wherein by way of the diaphragm (3), a valve seat (6) can be opened and closed. At least one clamping region (23) is formed radially outside of a clamping region (8), which clamping region (23) protrudes from the clamping region (8), and on the end face of which a sealing surface (11, 12) is formed.

10 Claims, 1 Drawing Sheet

(56) References Cited

U.S. PATENT DOCUMENTS

| | | | | |
|---|---|---|---|---|
| 4,135,696 | A | * | 1/1979 | Saarem ................ F16K 31/402 251/30.02 |
| 4,893,645 | A | * | 1/1990 | Augustinas ........... F16K 31/402 137/315.03 |
| 5,031,875 | A | * | 7/1991 | Zimmerman .............. F16J 3/02 251/61.1 |
| 5,090,393 | A | * | 2/1992 | Holch .................. F01M 13/023 123/574 |
| 5,291,822 | A | * | 3/1994 | Alsobrooks ............... F16J 3/02 92/93 |
| 5,669,418 | A | * | 9/1997 | Wode ................ B60G 17/0528 137/859 |
| 5,979,482 | A | * | 11/1999 | Scott .................... F16K 31/402 137/15.01 |
| 6,295,918 | B1 | * | 10/2001 | Simmons ................ F15B 15/10 92/98 R |
| 6,719,268 | B2 | * | 4/2004 | Fukano .................... F16K 7/14 251/129.17 |
| 8,733,402 | B2 | * | 5/2014 | Goerlich ............ G05D 16/0672 137/859 |
| 9,423,037 | B2 | * | 8/2016 | Obara .................... F16K 7/126 |
| 10,077,846 | B2 | | 9/2018 | Eurich et al. |
| 2009/0072173 | A1 | * | 3/2009 | Hasunuma .............. F16K 31/04 251/129.12 |
| 2013/0014639 | A1 | * | 1/2013 | Takeshita .................. F16J 3/02 92/96 |

FOREIGN PATENT DOCUMENTS

| | | |
|---|---|---|
| DE | 202009013401 | 9/2010 |
| DE | 102010060085 | 4/2012 |
| DE | 202010018358 | 12/2015 |
| JP | 2001-98596 A * | 4/2001 |

* cited by examiner

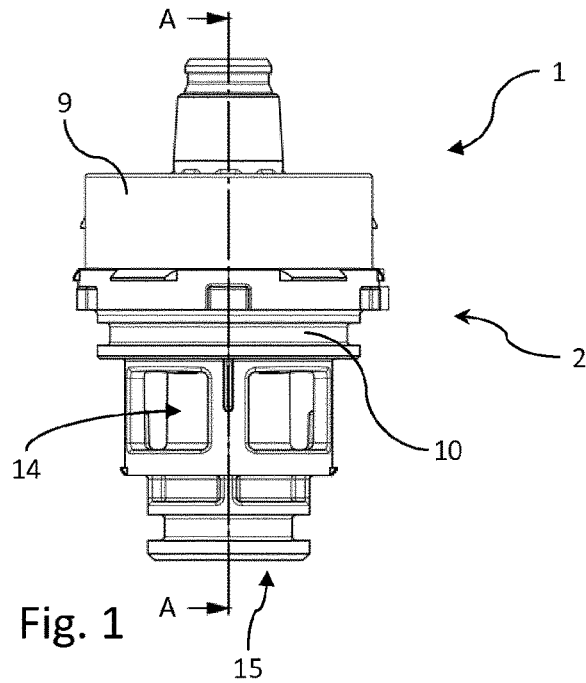
Fig. 1
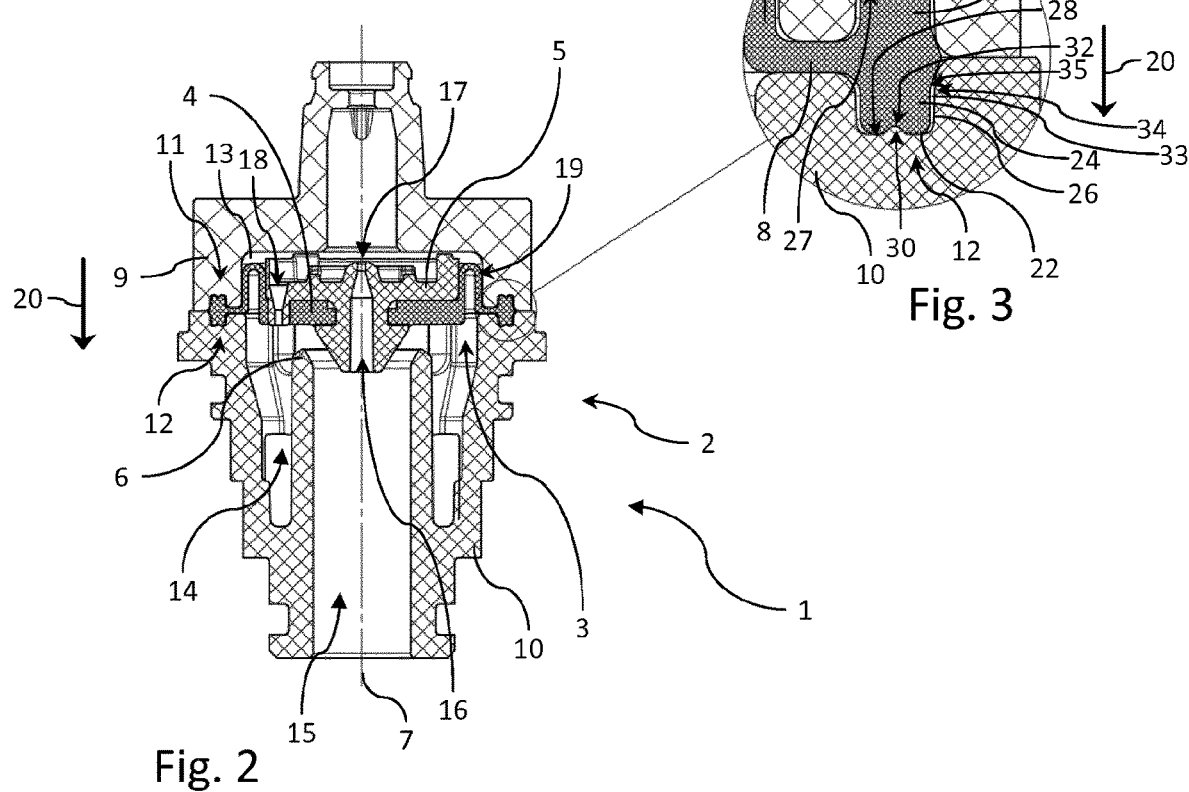
Fig. 3
Fig. 2

DIAPHRAGM VALVE

BACKGROUND

The invention relates to a diaphragm valve having a housing and a diaphragm which is arranged within the housing and the central region of which can be moved to and fro in order to close and/or open a valve seat, the diaphragm being clamped in by way of a clamping region between two housing parts, the diaphragm having at least one sealing face.

Here, the clamping region can movably support a valve body, by way of which the valve seat can be closed and opened.

A diaphragm valve of this type is known, for example, from DE 10 2010 060 085 A1 and DE 20 2010 018 358 U1, the diaphragm having sealing faces which are oriented substantially in a direction parallel to the clamping direction. The sealing faces are therefore oriented radially in relation to a longitudinal axis of the diaphragm valve.

SUMMARY

The invention is based on the object of providing an alternative to the previously known diaphragm valves, in particular of making simpler assembly possible.

In order to achieve the object, one or more features according to the invention are provided. In particular, it is therefore provided according to the invention for achieving the object in the case of a diaphragm valve of the type described at the outset that the at least one sealing face is oriented at least substantially in a direction transversely with respect to a clamping direction, and is configured on an end side of a plug-in region which runs at least substantially in a direction parallel to the clamping direction, in particular that the at least one sealing face is oriented in a direction transversely with respect to a clamping direction, and is configured on an end side of a plug-in region which runs in a direction parallel to the clamping direction, that the plug-in region engages into a corresponding recess on one housing part of the two housing parts, and that a sealing projection which protrudes from a recess bottom and presses against the at least one sealing face is configured in the recess. Axial sealing faces in relation to a longitudinal axis of the diaphragm valve are therefore configured. A great tightness can be achieved by way of the sealing projection, although the plug-in region is deformed along its entire length by way of a contact pressure. The plug-in region therefore serves in the radial direction not for sealing purposes, but rather merely as a tie rod. In comparison with clamping of the diaphragm on both sides of the plug-in region which likewise serves as a tie rod, the invention affords the advantage that the diaphragm can operate in an unimpeded manner. The sealing face can be arranged in a protected manner in the recess.

It can be provided in one refinement of the invention that the plug-in region protrudes as a projection from the clamping region at an angle, preferably a right angle. Therefore, in addition to its sealing function, the plug-in region can also assume the function of a tie rod if the recess is of corresponding configuration.

It can be provided in one refinement of the invention that the plug-in region is configured so as to run around the clamping region. In this way, tensile loading can be absorbed along the entire circumference of the diaphragm. It is particularly favorable if the plug-in region is configured with a constant profile, for example a rectangular or trapezoidal profile in a preferably rounded manner. This makes satisfactory filling of the recess possible.

It can be provided in one refinement of the invention that the recess is configured so as to run around the clamping region. It is advantageous here that a diaphragm can be inserted in an undefined orientation or alignment, in particular in the case of a recess which runs in a circular manner. In this way, moreover, a plug-in region of circumferential configuration can be received.

In general, it can be said that one preferred refinement has a diaphragm with a circular contour. The terms radial and axial which are defined in relation to the abovementioned longitudinal axis can therefore be applied to a diaphragm of this type if the longitudinal axis is oriented perpendicularly with respect to the at least substantially planar diaphragm and runs centrally through the latter, in particular if the longitudinal axis is oriented perpendicularly with respect to the planar diaphragm and runs centrally through the latter.

It can be provided in one refinement of the invention that the sealing projection extends over a length of the recess. In this way, all-round sealing of the diaphragm on its entire circumference can be achieved simply.

It can be provided in one refinement of the invention that a further plug-in region is configured in relation to the clamping region on a side which lies opposite the plug-in region, which further plug-in region engages into a corresponding recess on a further housing part of the two housing parts. This makes it possible to hold the diaphragm on both sides (above and below).

It can be provided in one refinement of the invention that a further sealing face is oriented at least substantially in a direction transversely with respect to the clamping direction, and is configured on an end side of the further plug-in region which runs at least substantially in a direction parallel to the clamping direction, in particular that a further sealing face is oriented in a direction transversely with respect to the clamping direction, and is configured on an end side of the further plug-in region which runs in a direction parallel to the clamping direction. The further plug-in region can firstly also absorb a tensile load of the diaphragm, as a further tie rod. Secondly, the further sealing face can be used as a bearing face, in order to absorb a force which acts on the sealing face.

It can be provided here that a further sealing projection which protrudes from a recess bottom and presses against the further sealing face is configured in the recess of the further housing part. In this way, a tight closure can be configured above and below the diaphragm.

It can be provided in one refinement of the invention that the plug-in region can be plugged with play into the respective recess. The play can be realized, for example, by virtue of the fact that an external diameter (measured transversely with respect to the clamping direction) of the plug-in region is configured to be at least partially smaller than an internal diameter (measured transversely with respect to the clamping direction) of the recess. It is advantageous here that a small resistance or even no resistance at all has to be overcome during plugging of the plug-in region into the recess. This can also apply as an alternative or in addition to the further plug-in region. This can have the consequence that, in the introduced state of the at least one plug-in region into the at least one recess, at least one gap is configured between a lateral inner wall of the recess and a lateral outer wall of the plug-in region. A contact pressure between the outer wall of the plug-in region and the inner wall of the recess can therefore be greatest between an end side of the plug-in region and a bottom region of the recess, in particular a sealing projection of the recess. In this way, the assembly of the diaphragm valve can be facilitated considerably by way of the configuration of a play. At the same time, however, satisfactory sealing is surprisingly possible between the plug-in region and the recess despite the play.

It can be provided in one refinement of the invention that the sealing face is of at least substantially planar configuration. In this way, at least substantially flat bearing (for example, apart from a deformation as a result of the sealing projection), in particular flat bearing, of the sealing face against the recess bottom can be achieved, in particular in a manner which is independent of precise positioning of the plug-in region in the recess. It can be provided, in particular, in one refinement of the invention that the sealing face is of planar configuration. It is particularly favorable here if the sealing face is of groove-free configuration. Material weakenings due to stress concentrations which can easily result in the case of the configuration of a groove can thus be avoided. This can also apply as an alternative or in addition to the further sealing face.

It can be provided in one refinement of the invention that the recess in the housing part forms a constriction toward the associated recess bottom. In this way, an insertion aid can be configured, by way of which the plug-in region can be oriented simply in relation to the sealing projection.

As an alternative or in addition, it can be provided that the recess in the further housing part forms a constriction toward the associated recess bottom. A defined orientation of the further sealing face in the recess during plugging in can therefore also be achieved here. It is particularly favorable if the recesses are of mirror-symmetrical configuration with respect to one another, in particular in relation to a plane of symmetry which runs between the housing parts.

It can be provided in one refinement of the invention that the sealing projection has a cross section which tapers toward a free end. In this way, the sealing projection can dig simply into the diaphragm. Here, a wedge-shaped cross section can be manufactured particularly simply.

BRIEF DESCRIPTION OF THE DRAWINGS

The invention will now be described in greater detail using one exemplary embodiment, but is not restricted to said exemplary embodiment. Further exemplary embodiments result from a combination of the features of single or plural claims among one another and/or with single or plural features of the exemplary embodiment.

In the drawings:

FIG. 1 shows a side view of a diaphragm valve according to the invention,

FIG. 2 shows a sectional view along A-A of the diaphragm valve in accordance with FIG. 1, and FIG. 3 shows an enlargement of a detail from FIG. 2.

DETAILED DESCRIPTION

FIGS. 1 to 3 show a diaphragm valve according to the invention which is denoted overall by 1 in different views, and will therefore be described together.

The diaphragm valve 1 has a housing 2 which receives a diaphragm 3 and surrounds it in a manner which forms a housing.

A center region 4 of the diaphragm 3 supports a valve body 5 which can be moved between an upper position which is shown in FIG. 2 and a lower position (not shown in further detail), in which the center region 4 of the diaphragm 3 lies with the valve body 5 on a valve seat 6 and closes said valve seat 6 sealingly.

The diaphragm 3 is clamped in by way of a clamping region 8 between a first housing part 9 and a second housing part 10 radially on the outside in relation to a longitudinal axis 7 of the diaphragm valve 1, which longitudinal axis 7 at the same time describes the movement direction of the valve body 5.

Here, the first housing part 9 and the second housing part 10 form the housing 2, possibly with further housing parts.

Here, the diaphragm 3 has a first sealing face 11 and a second sealing face 12, by way of which it seals a pressure chamber 13 firstly and an inlet 14 secondly to the outside.

The inlet 14 is connected via the valve seat 6 to an outlet 15 when the valve body 5 is situated in the abovementioned upper position, and is disconnected from said outlet 15 when the valve body 5 is arranged in the lower position on the valve seat 6. In order to transfer the valve body 5 into the lower closed position, a relief opening 16 on an auxiliary valve seat 17 is closed by way of an auxiliary valve body (not shown in further detail), with the result that the pressure chamber 13 is filled via a filling opening 18 in the diaphragm 3. As a result of the pressure rise, possibly assisted by way of a spring force, the valve body 5 is transferred into the closed position.

In order to open the diaphragm valve 1, the auxiliary valve seat 17 is released, with the result that the pressure chamber 13 can be emptied via the relief opening 16 into the outlet 15. Said pressure relief leads to the internal pressure in the inlet 14 forcing a removal of the valve body 5 from the valve seat 6, with the result that a liquid can flow out of the inlet 14 into the outlet 15.

A folding region 19 which ensures the movability of the diaphragm 3 is configured between the clamping region 8 and the center region 4. Here, the diaphragm 3 is manufactured from an elastic material, for example rubber, or silicone.

The sealing faces 11, 12 are oriented substantially in a direction which results in an alignment transversely with respect to the clamping direction 20. This means that the perpendiculars on the sealing faces 11, 12 run in each case parallel or approximately parallel to the clamping direction 20, by way of which the first housing part 9 is pressed against the second housing part 10.

To this end, the sealing faces 11, 12 are configured in each case on an end side 21, 22 of a plug-in region 23, 24.

Here, in the mounted state, the plug-in region 23 engages into a corresponding recess 25 on the first housing part 11, whereas the plug-in region 24 is plugged into a corresponding recess 26 on the second housing part 10.

A sealing projection 29, 30 which is pressed into the respective sealing face 11, 12 is configured on each of the recesses 25, 26 on a recess bottom 27, 28.

In order to make the plugging into the recesses 25, 26 possible, each of the plug-in regions 23, 24 is configured as a projection which is oriented at a right angle in relation to the clamping region 8 and protrudes from said clamping region 8.

The plug-in regions 23, 24 run in each case around the clamping region 8 and have a constant profile along their course direction.

In a manner which corresponds with this, the respective recess 25, 26 is likewise configured so as to run around the clamping region 8, and is provided with a cross section, with the result that a groove is formed.

The sealing projection 29, 30 is in each case likewise of circumferential configuration and therefore extends over the entire length of the respective recess 25, 26.

The plug-in regions 23, 24 are configured on sides which lie opposite one another in relation to the clamping region 8, with the result that said plug-in regions 23, 24 can engage into the two receptacles of the recesses 25, 26.

The sealing faces 11, 12 are therefore oriented parallel to one another.

When the first housing part 9 is pressed against the second housing part 10, the sealing projections 29, 30 are pressed into the respective sealing face 11 and 12, respectively.

The sealing faces 11, 12 are configured as planar faces which extend around in an annular manner before said pressing-in operation, however.

A groove or the like for receiving the sealing projections 29, 30 is therefore not configured in the sealing faces 11, 12, with the result that a sealing action is not dependent on whether the plug-in regions 23, 24 are plugged into the respective recesses 25, 26 in a correctly oriented manner.

The recesses 25, 26 have a constriction toward the respective recess bottom 27, 28, and thus form an insertion aid for the plug-in regions 23, 24.

As can be seen in FIG. 3, the sealing projections 29, 30 have a cross section which tapers toward the respective free end 31, 32. Therefore, the sealing projections 29, 30 form a wedge shape (in cross section) which protrudes from the recess bottom 27 and 28, respectively.

This can be seen, since the plug-in regions 23, 24 are configured spaced apart from the recesses 25, 26 in the radial direction, that is to say laterally with respect to their course direction.

In the case of the diaphragm valve 1, in the case of which a diaphragm 3 is clamped in between two housing parts 9, 10 and in the case of which a valve seat 6 can be opened and closed by way of the diaphragm 3, it is therefore provided to configure at least one clamping region 23 radially outside a clamping region 8, which clamping region 23 projects from the clamping region 8 and on the end side 21, 22 of which clamping region 23 a sealing face 11, 12 is configured.

If the plug-in region 23, 24 is introduced into the at least one recess 25, 26, at least one gap 33 is configured between the two. Here, the gap 33 is configured, in particular, between a lateral inner wall 34 of the recess 25, 26 and a lateral outer wall 35 of the plug-in region 23, 24. As a result of the gap 33, the plug-in region 23, 24 can be plugged with a play into the respective recess 25, 26. Therefore, the assembly of the diaphragm valve 1 is simplified considerably.

In order to achieve a sufficient sealing action between the diaphragm 3 and the housing parts 9, 10 despite the configuration of the gap 33, a contact pressure between the outer wall of the plug-in region 23, 24 and the inner wall of the recess 25, 26 is therefore greatest between an end side 21, 22 of the plug-in region 23, 24 and a bottom region of the recess 25, 26. Here, the generated contact pressure is particularly great, in particular, in the region of the sealing projection 29, 30. Therefore, a sufficient sealing action is configured in said region.

LIST OF DESIGNATIONS

1 Diaphragm valve
2 Housing
3 Diaphragm
4 Center region
5 Valve body
6 Valve seat
7 Longitudinal axis
8 Clamping region
9 (First) housing part
10 (Second) housing part
11 (First) sealing face
12 (Second) sealing face
13 Pressure chamber
14 Inlet
15 Outlet
16 Relief opening
17 Auxiliary valve seat
18 Filling opening
19 Folding region
20 Clamping direction
21 End side
22 End side
23 Plug-in region
24 Plug-in region
25 Recess
26 Recess
27 Recess bottom
28 Recess bottom
29 Sealing projection
30 Sealing projection
31 Free end
32 Free end
33 Gap
34 Lateral inner wall
35 Lateral outer wall

The invention claimed is:

1. A diaphragm valve (1), comprising:
a housing (2) having first and second housing parts (9, 10);
a diaphragm (3) arranged within the housing (2) and a center region (4) of said diaphragm supporting a valve body (5), which is movable back and forth in order to at least one of close or open a valve seat (6), the valve body (5) comprising a relief opening (16) on an auxiliary valve seat (17) formed thereon, the diaphragm (3) being clamped in by way of a clamping region (8) thereof between the first and second housing parts (9, 10);
the diaphragm (3) having two sealing faces (11, 12), which are arranged transverse to a clamping direction (20) and above and below the clamping region (8), the sealing faces are configured on respective end sides (21, 22) of first and second plug-in regions (23, 24) of the diaphragm (3) which run in a direction parallel to the clamping direction (20);
the first housing part (9) comprising a first recess (25), and the first plug-in region (23) engages into the recess (25) of the first housing part (9); the second plug-in region (24) is configured in relation to the clamping region (8) on a side which lies opposite the first plug-in region (23), said second plug-in region (24) engages into a second recess (26) of the second housing part (10); and
first and second sealing projections (29, 30) protrude from a recess bottom (27, 28) of the corresponding recess and presses against the first and second sealing faces (11, 12), respectively, wherein a height of the first and second sealing projections (29, 30), which protrudes from the recess bottom (27, 28) of the corresponding recess (25, 26) is substantially smaller than a height of the recess such that the sealing projections (29, 30)

press into the respective sealing faces (11, 12), which are configured as planar faces; and wherein at least one gap (33) is configured between the respective plug-in region (23, 24) and the corresponding respective recess (25, 26) such that the plug-in regions (23, 24) can be plugged with play into the respective recesses (25, 26).

2. The diaphragm valve (1) as claimed in claim 1, wherein the first and second plug-in regions (23, 24) protrude as projections from the clamping region (8) at right angles.

3. The diaphragm valve (1) as claimed in claim 1, wherein the first and second recesses (25, 26) are configured to extend around the clamping region (8).

4. The diaphragm valve (1) as claimed in claim 1, wherein at least one of the first or second recesses (25, 26) forms a constriction toward an associated one of the recess bottoms (27, 28).

5. The diaphragm valve (1) as claimed in claim 1, wherein the first and second sealing projections (29, 30) have a cross section which is wedge-shaped and tapers toward a free end (31, 32) thereof.

6. The diaphragm valve (1) as claimed in claim 1, wherein the first and second plug-in regions (23, 24) are configured so as to extend around the clamping region (8) having a constant cross-section.

7. The diaphragm valve (1) as claimed in claim 1, wherein the first and second sealing projections (29, 30) extend over a length of the first and second recesses (25, 26), respectively.

8. The diaphragm valve (1) according to claim 1, wherein the valve seat (6) is closed by the center region (4) of the diaphragm (3) lying with the valve body (5) on the valve seat (6), closing the valve seat in a sealing manner.

9. The diaphragm valve (1) according to claim 1, wherein the valve is opened by emptying a pressure chamber (13) via the relief opening (16) into an outlet (15).

10. The diaphragm valve (1) according to claim 9, wherein the emptying of the pressure chamber (13) leads to an internal pressure in an inlet (14) of the second housing part (10), which causes removal of the valve body (5) from the valve seat (6), resulting in liquid flowing out of the inlet (14) into the outlet (15) of the second housing part (10).

* * * * *

UNITED STATES PATENT AND TRADEMARK OFFICE
CERTIFICATE OF CORRECTION

PATENT NO. : 11,549,596 B2
APPLICATION NO. : 16/474755
DATED : January 10, 2023
INVENTOR(S) : Marc Tempel It is certified that error appears in the above-identified patent and that said Letters Patent is hereby corrected as shown below:

In the Claims

In Claim 1, at Column 6, Line 66, after the words "recess (25, 26) is", delete the word "substantially".

Signed and Sealed this
Twenty-fifth Day of July, 2023

Katherine Kelly Vidal
*Director of the United States Patent and Trademark Office*